(12) United States Patent
Jeck et al.

(10) Patent No.: US 7,729,727 B2
(45) Date of Patent: Jun. 1, 2010

(54) ALIGNING RADIO BASE STATION NODE TRANSMISSION TIMING ON MULTIPLE TRANSMIT PATHS

(75) Inventors: Michael Jeck, Mainz (DE); Uwe Hildebrand, Erlangen (DE)

(73) Assignee: Telefonaktiebolaget LM Ericson (publ), Stockholm (SE)

( * ) Notice: Subject to any disclaimer, the term of this patent is extended or adjusted under 35 U.S.C. 154(b) by 683 days.

(21) Appl. No.: 11/632,318

(22) PCT Filed: Jun. 30, 2005

(86) PCT No.: PCT/SE2005/001067

§ 371 (c)(1),
(2), (4) Date: Jan. 12, 2007

(87) PCT Pub. No.: WO2006/004526

PCT Pub. Date: Jan. 12, 2006

(65) Prior Publication Data

US 2008/0300003 A1 Dec. 4, 2008

Related U.S. Application Data

(60) Provisional application No. 60/585,098, filed on Jul. 6, 2004.

(51) Int. Cl.
*H04B 1/38* (2006.01)
(52) U.S. Cl. .................... 455/561; 455/103; 370/328
(58) Field of Classification Search ............... 455/103, 455/507, 517, 550.1, 561; 370/328
See application file for complete search history.

(56) References Cited

U.S. PATENT DOCUMENTS

| 6,229,483 B1 | 5/2001 | Looström |
| 6,327,299 B1 | 12/2001 | Meszko |
| 7,127,222 B2 * | 10/2006 | Kim et al. ............. 455/232.1 |

(Continued)

FOREIGN PATENT DOCUMENTS

EP 0 938 204 A1 8/1999

(Continued)

OTHER PUBLICATIONS

International Search Report mailed Nov. 1, 2005 in corresponding PCT Application No. PCT/Se05/01067.

(Continued)

*Primary Examiner*—Nhan Le
(74) *Attorney, Agent, or Firm*—Nixon & Vanderhye, P.C.

(57) ABSTRACT

A radio base station node (20) of a telecommunications network comprises a baseband transmitter (22) and plural radio frequency (RF) paths (24) between the baseband transmitter (22) and an antenna system (30). A measurement entity (32) is provided, preferably near the antenna system (30), for making a measurement or comparison of a time of detecting of a power modulation for each of plural RF transmission paths (24), e.g., a time of detecting of a power modulation for a first of the plural RF transmission paths and a time of detection of a power modulation for a second of the plural RF transmission paths. A transmission timing adjustment unit (34) uses the power modulation measurement or comparison for adjusting timing of transmission of signals for the plural RF transmission paths for obtaining a desired time alignment for the plural RF transmission paths.

14 Claims, 12 Drawing Sheets

U.S. PATENT DOCUMENTS

| | | |
|---|---|---|
| 7,421,254 B2 * | 9/2008 | Behzad .................... 455/115.1 |
| 2003/0016082 A1 * | 1/2003 | Matsunaga et al. .......... 330/133 |
| 2003/0171139 A1 | 9/2003 | Sarresh et al. |
| 2004/0212436 A1 * | 10/2004 | Matsunaga et al. .......... 330/285 |
| 2009/0175362 A1 * | 7/2009 | Priotti ....................... 375/260 |

FOREIGN PATENT DOCUMENTS

| | | |
|---|---|---|
| WO | 99/63619 A1 | 12/1999 |
| WO | 03/021287 A1 | 3/2003 |

OTHER PUBLICATIONS

International Preliminary Report on Patentability mailed Oct. 18, 2006 in corresponding PCT Application No. PCT/SE05/01067.

* cited by examiner

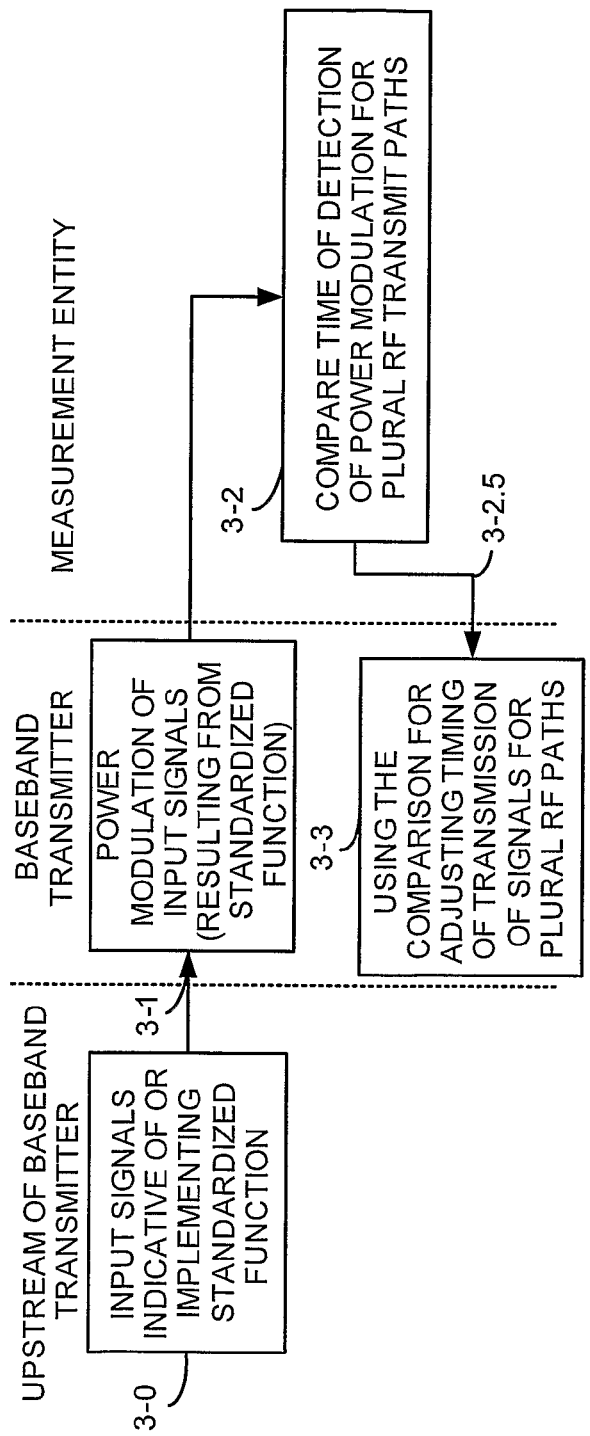

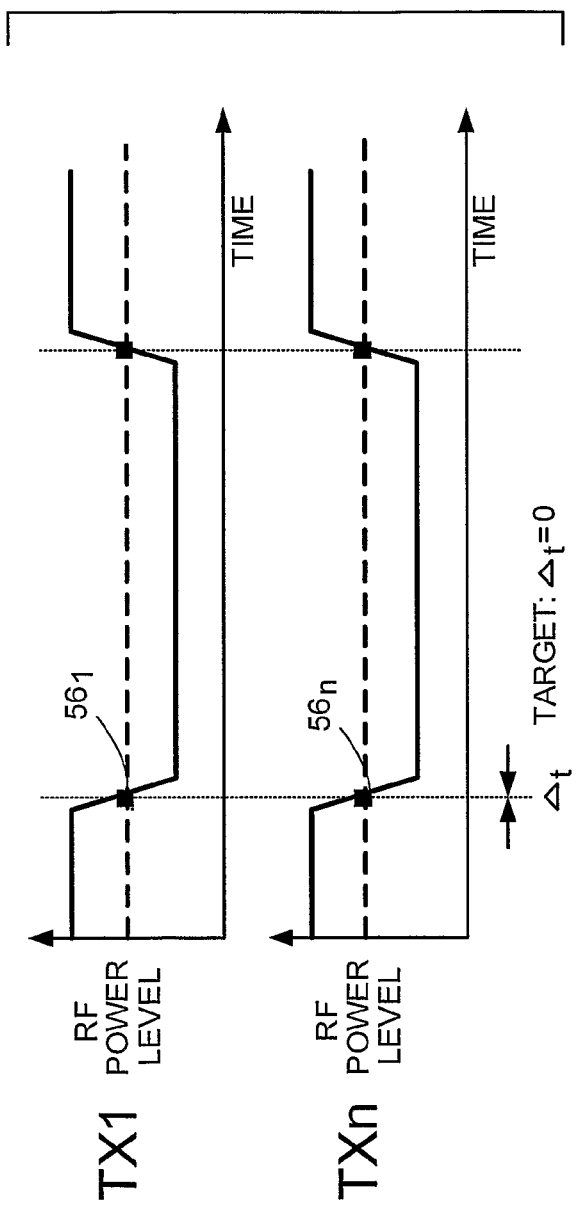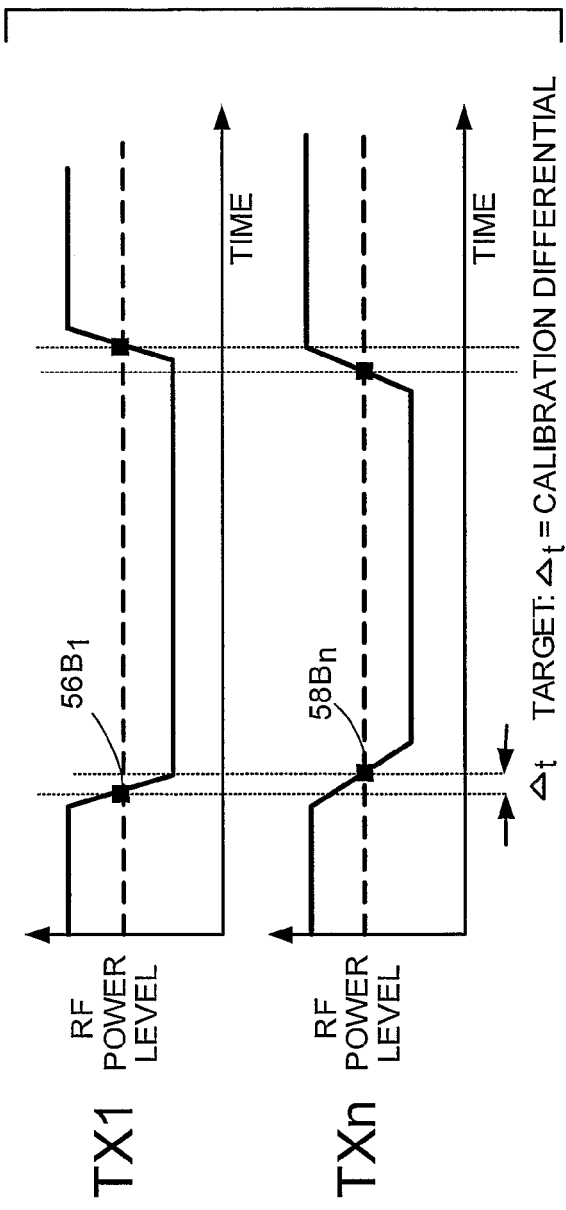

ALIGNING RADIO BASE STATION NODE TRANSMISSION TIMING ON MULTIPLE TRANSMIT PATHS

This application is the US national phase of international application PCT/SE2005/001067, filed Jun. 30, 2005, which designated the U.S., and which claims the benefit of U.S. Provisional Application 60/585,098 filed Jul. 6, 2004, the entire contents of which are hereby incorporated by reference.

This application claims the benefit and priority of U.S. Provisional Patent Application 60/585,098, filed Jul. 6, 2004, which is incorporated herein by reference in its entirety.

BACKGROUND

1. Field of the Invention

The present invention pertains to wireless telecommunications, and particularly to alignment of plural transmit paths in a radio base station node of a telecommunications system.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a (radio) base station. A cell is a geographical area where radio coverage is provided by the radio base station equipment at a base station site. Each cell is identified by a unique identity, which is broadcast in the cell. The radio base stations communicate over the air interface (e.g., radio frequencies) with the user equipment units (UE) within range of the base stations. In the radio access network, several radio base stations are typically connected (e.g., by landlines or microwave) to a radio network controller (RNC). The radio network controller, also sometimes termed a base station controller (BSC), supervises and coordinates various activities of the plural radio base stations connected thereto. The radio network controllers are typically connected to one or more core networks.

One example of a radio access network is the Universal Mobile Telecommunication System (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

For sake of providing diversity, some radio base stations have plural RF transmission paths between a baseband transmitter and a radio base station antenna. In such cases, and particularly in a WCDMA system, significant constraints are imposed on the operation of the radio base station regarding the allowed timing difference of transmit (TX) transmission on the different transmission paths. For example, in accordance with one 3GPP technical specification, the allowed deviation between transmission paths is ⅛ chip, which corresponds to approximately 32 ns.

The technology currently used in radio base station nodes which operate in accordance with GSM or WCDMA is to statically calibrate the delay (e.g. on the transmit paths). This static delay calibration occurs e.g. during start-up of the system. The delay values used in the calibration are either general design based figures or explicitly determined by production measurements for hardware entities.

It has also elsewhere been proposed to use test mobiles or other type of radio based receivers for calibration and adjustment purposes related to transmit delay and time alignment. For example, see U.S. patent application Ser. No. 10/045,024, filed Jan. 15, 2002, entitled "DIVERSITY BRANCH DELAY ALIGNMENT IN RADIO BASE STATION," which is incorporated herein by reference.

It is extremely onerous to comply with the requirements concerning the allowed timing difference of transmit (TX) transmission on the different transmission paths. Difficulties arise from various factors or timing uncertainties and/or variations in the radio base station nodes themselves, both in digital components and (perhaps even more) in analog components forming a transmit path up to the antenna. The problems of delay differences and variations are particularly acute in the case of co-sited radio base stations (occurring, e.g., in GSM and UMTS) where radio frequency (RF) equipment is shared.

What is needed, therefore, and an object of the present invention, is technique, apparatus, and method for providing more accurate alignment timing between differing transmit branches of a radio base station node.

BRIEF SUMMARY

A radio base station node of a telecommunications network comprises a baseband transmitter and plural radio frequency (RF) paths between the baseband transmitter and an antenna system. A measurement entity is provided, preferably near the antenna system, for making a measurement or comparison of a time of detecting of a power modulation for each of plural RF transmission paths, e.g., a time of detecting of a power modulation for a first of the plural RF transmission paths and a time of detection of a power modulation for a second of the plural RF transmission paths. A transmission timing adjustment unit uses the power modulation measurement or comparison for adjusting timing of transmission of signals for the plural RF transmission paths for obtaining a desired time alignment for the plural RF transmission paths. The transmission timing adjustment unit is preferably situated at the baseband transmitter.

In one example embodiment, the power modulation of the signals can occur upstream from the baseband transmitter. For example, the power modulation of the signals can occur in conjunction with a standardized function such as (for example) an Idle Period Downlink (IPDL) function or a Discontinuous Transmission (DXT) function.

In an example implementation, the measurement entity for making the comparison (of the time of detecting of a power modulation for a first of the plural RF transmission paths and the time of detection of a power modulation for a second of the plural RF transmission paths) is preferably performed at a tower mounted amplifier (TMA) unit. Such example implementation is also preferably provided with (e.g., the measurement entity comprises) means for reporting the comparison to the baseband transmitter.

As an optional aspect of the technology, the radio base station node (e.g., the measurement entity in one example implementation) further comprises means for validating the measurement or comparison. The means for validating the measurement or comparison requires that time of detection of the power modulation for the second of the plural RF transmission paths occur within a predetermined validation time interval of the time of detection of the power modulation for the first of the plural RF transmission paths.

In an example implementation, the transmission timing adjustment unit, which serves as means for using the power modulation measurement or comparison, is arranged to adjust transmission points in time in a baseband domain so that an optimal time alignment exists between the plural RF transmission paths. In a first mode of operation, the desired time alignment is for a difference in (1) the time of detection of the power modulation for the first of the plural RF transmission paths and (2) the time of detection of the power modulation for the second of the plural RF transmission paths to substantially equal a predefined value, such as zero, for example. In other words, then the predefined value is zero, the time of detection of the power modulation for the first of the plural RF transmission paths and the time of detection of the power modulation for the second of the plural RF transmission paths are substantially the same (i.e., equal).

The first example mode of operation involves (1) providing a power modulation of signals applied by the baseband transmitter to the plural RF transmission paths; (2) making a measurement or comparison of a time of detection of the power modulation for a first of the plural RF transmission paths and a time of detection of the power modulation for a second of the plural RF transmission paths; and (3) using the measurement or comparison of step (2) for adjusting timing of transmission of signals for the plural RF transmission paths for obtaining a desired time alignment for the plural RF transmission paths. The power modulation can be, for example, a decrease in RF transmission power. As mentioned above, the modulation (e.g., decrease) in RF transmission power can occur in conjunction with a standardized function (e.g., an Idle Period Downlink (IPDL) function or a Discontinuous Transmission (DXT) function) or in conjunction with radio base station internal periods of decreased power.

In one example implementation, the step of making the measurement or comparison comprises: (a) detecting an edge of a RF power level curve of the first of the plural RF transmission paths; (b) detecting an edge of a RF power level curve of the second of the plural RF transmission paths; (c) comparing time of the edge of substep (a) and the edge of substep (b). In one variation in which the measurement or comparison is made remotely from the baseband transmitter, e.g., proximate the antenna system such as at a tower mounted amplifier unit (TMA), the method further comprises reporting the comparison of step (2) to the baseband transmitter.

As an optional aspect of the technology, the method can further include validating the measurement or comparison by requiring that time of detection of the power modulation for the second of the plural RF transmission paths occur within a predetermined validation time interval of the time of detection of the power modulation for the first of the plural RF transmission paths.

In a second mode of operation, the desired time alignment is for the time of detection of the power modulation for the first of the plural RF transmission paths and the time of detection of the power modulation for the second of the plural RF transmission paths to be substantially equal to a calibrated differential alignment. To this end, another embodiment comprises a calibration differential alignment unit (e.g., means for determining the calibrated differential alignment). A test signal generator is arranged to generate, at the baseband transmitter, test signals of a predetermined character which can be utilized to produce a desired inter-path interaction of the test signals. The desired inter-path interaction of the test signals can be, for example, a specified degree of cancellation of the test signals.

As an optional aspect, another example implementation of the method further comprises usage of a sampling check function. The sampling check function makes a determination whether steps (1)-(3) of the first mode are repeated within a predetermined sampling time interval. If a determination is made that the steps (1)-(3) are not repeated within the predetermined sampling time interval, the method further comprises causing the radio base station node internally to generate the power modulation.

The test signals of the second example mode can be a sequence of test symbols using a same timing (e.g., chip timing). The I and Q components of each test symbol in a particular transmit path can be chosen as follows: in an ideal environment for each symbol period the combination (addition) of the complex radio signals generated from those I and Q components result in a complex RF signal with amplitude equal to zero (e.g., a lowest power level). Such provides maximum cancellation.

Thus, in another example embodiment, the power modulation of the signals can be performed by the baseband transmitter or means situated at the baseband transmitter. For example, the power modulation of the signals can occur during and/or in conjunction with radio base station internal periods of decreased power. Such can occur, for example, as a result of the sampling check function making its determination that first mode steps (1)-(3) are not formed with the prescribed frequency.

In one example implementation, the step of using the measurement or comparison comprises adjusting transmission points in time in a baseband domain so that an optimal time alignment exists between the plural RF transmission paths. As mentioned above, in a first example mode of operation the desired time alignment is for the time of detection of the power modulation for the first of the plural RF transmission paths and the time of detection of the power modulation for the second of the plural RF transmission paths to be substantially equal.

If the first example mode of operation results in sufficient resolution and/or accuracy, the first mode may be employed without aid of further modes of operation. However, if the first mode of operation alone does not achieve satisfactory resolution and/or accuracy, other modes can be utilized in conjunction or in addition thereto, such as the second example mode of operation described below.

In the second example mode of operation, the desired time alignment is for the time of detection of the power modulation for the first of the plural RF transmission paths and the time of detection of the power modulation for the second of the plural RF transmission paths to be substantially equal to a calibrated differential alignment. This second mode of operation further comprises determining the calibrated differential alignment by performing the steps of: generating, at the baseband transmitter, test signals of a predetermined character; applying the test signals with plural test application timing differentials to the first of the plural RF transmission paths and the second of the plural RF transmission paths; using as the calibrated differential alignment a one of the plural test application timing differentials which produces a desired inter-path interaction of the test signals. The desired inter-path interaction of the test signals can be a specified degree of cancellation of the test signals.

The second example mode of operation is preferably performed in a calibration phase which precedes or is distinct from a monitoring and adjustment phase during which the first example mode of operation is performed. When the second example mode of operation has been performed, the desired time alignment subsequently utilized in the first mode of operation is the calibrated differential alignment determined in the second example mode.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is diagrammatic view showing basic actions performed in a first mode of a transmit path timing alignment operation of the radio base station, wherein power modulation is performed exterior to a baseband transmitter of a radio base station node.

FIG. 4A is a timing diagram showing RF power level curves for two RF transmission paths of a radio base station node for illustrating the first mode of the transmit path timing alignment operation.

FIG. 4B is a timing diagram showing RF power level curves for two RF transmission paths of a radio base station node for illustrating the first mode of the transmit path timing alignment operation in a situation in which a second mode or calibration phase has been previously performed.

FIG. 8 is diagrammatic view showing basic actions performed in a first mode of a transmit path timing alignment operation of the radio base station, wherein power modulation is performed at a baseband transmitter of a radio base station node.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor(s) or general purpose computer(s), either distributed or concentrated, and using an application specific integrated circuit (ASIC), and/or using one or more digital signal processors (DSPs).

Figure 1:
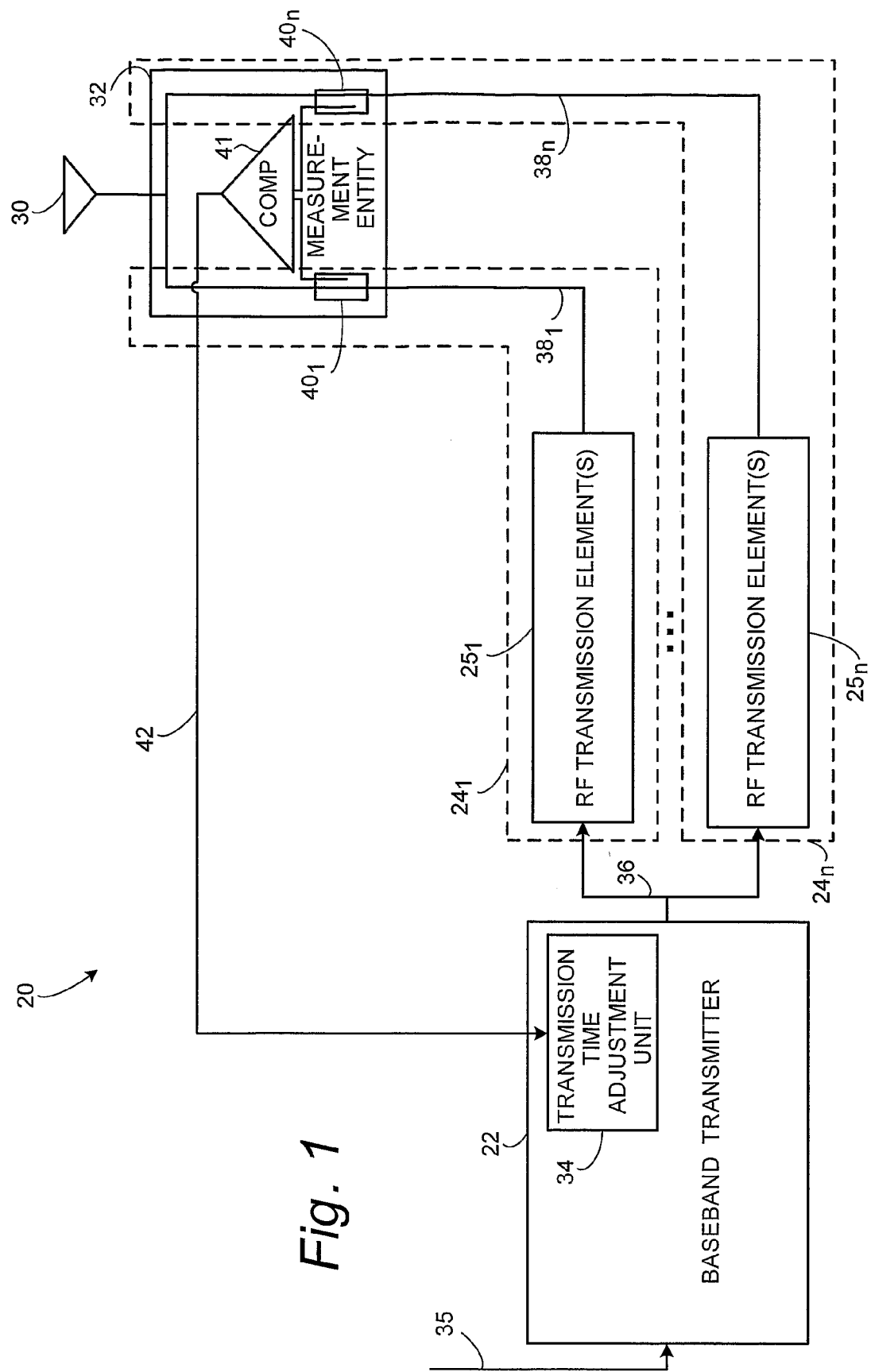
FIG. 1 is a schematic view of a first example embodiment of a radio base station node.

FIG. 1 shows a first example embodiment of a radio base station node 20 which performs a power modulation-based transmit path timing alignment operation. The radio base station node 20 can be situated in or utilized by any suitable telecommunications network which employs transmit diversity, e.g., essentially the same information signal reaching a mobile station or user equipment unit (UE) via plural transmit paths of a radio base station node so that, e.g., at any moment a best signal of the plural transmit paths can be utilized.

As shown in FIG. 1, radio base station node 20 comprises a baseband transmitter 22 and plural radio frequency (RF) paths $24_1$ through $24_n$ which exist or extend between the baseband transmitter 22 and an antenna system 30. The plural radio frequency (RF) paths $24_1$ through $24_n$ respectively comprise sets of one or more radio transmission elements $25_1$ through $25_n$. A measurement entity 32 is provided, preferably near the antenna system 30, for making a measurement or comparison of a time of detecting of a power modulation for each of the plural RF transmission paths $24_1$ through $24_n$. That is, the measurement entity 32 makes a measurement or comparison of a time of detecting of a power modulation for a first of the plural RF transmission paths $24_1$ and a time of detection of a power modulation for a second of the plural RF transmission paths $24_2$.

A transmission timing adjustment unit 34 uses the power modulation measurement or comparison for adjusting timing of transmission of signals for the plural RF transmission paths $24_1$-$24_n$. The reason for the adjustment of the timing of transmission signals is for obtaining a desired time alignment for (e.g., between) the plural RF transmission paths $24_1$-$24_n$. The transmission timing adjustment unit 34 is preferably but not necessarily situated at baseband transmitter 22.

As depicted by arrow 35, baseband transmitter 22 is connected to receive, from an unillustrated upstream buffer or source, an information signal which is to be modulated and transmitted by the radio base station to a mobile station or user equipment unit (UE). At the baseband transmitter 22 the information signal undergoes baseband modulation and is applied by line 36 to plural radio frequency (RF) paths $24_1$-$24_n$. In each radio frequency (RF) path 24 the information signal further undergoes carrier modulation.

In the embodiment of FIG. 1 and other embodiments herein described, it is possible to employ plural baseband transmitters in lieu of the one baseband transmitter 22 shown in FIG. 1. In other words, the functionality of baseband transmitter 22 may be distributed or divided over several units, in which case the RF transmission paths 36 may be connected by differing lines to differing baseband transmitters.

The radio frequency (RF) paths $24_1$-$24_n$ include respective feeder lines $38_1$-$38_n$ which connect the respective radio transmission elements $25_1$-$25_n$ to antenna system 30. The person skilled in the art understands that antenna system 30 can comprise one or more antenna elements since, e.g., for transmit diversity spatial diversity effects are based on multiple antennas for transmission. A coupler 40 is provided along each of the feeder lines 38, so that the carried modulated information signal is not only applied to antenna system 30, but also coupled into a respective input port of a comparator 41 of measurement entity 32. For example, coupler $40_1$ is provided on feeder line $38_1$ and coupler $40_n$ is provided on feeder line $38_n$. An output port of measurement entity 32 (e.g., of comparator 41) is connected by a signaling link 42 to transmission timing adjustment unit 34. The signaling link 42 can serve as means for reporting the measurement or comparison to the baseband transmitter 22.

Although for sake of convenience the signaling link 42 is illustrated separately in FIG. 1 and other drawings, it should be understood that the function of signaling link 42 can be performed or carried by a cable which also serves as one of the feeder lines 38. In an example implementation, communication over signaling link 42 is accomplished by transferring serial data streams over an RF cable, in somewhat of a switched DC loop using a self-clocking mode. The information bits of these serial data streams are represented by a DC voltage level of the RF signal. Low pass filters in the signaling path remove the high frequency signal parts. Having a dedicated signaling link 42 is also feasible for other implementations.

Figure 2:
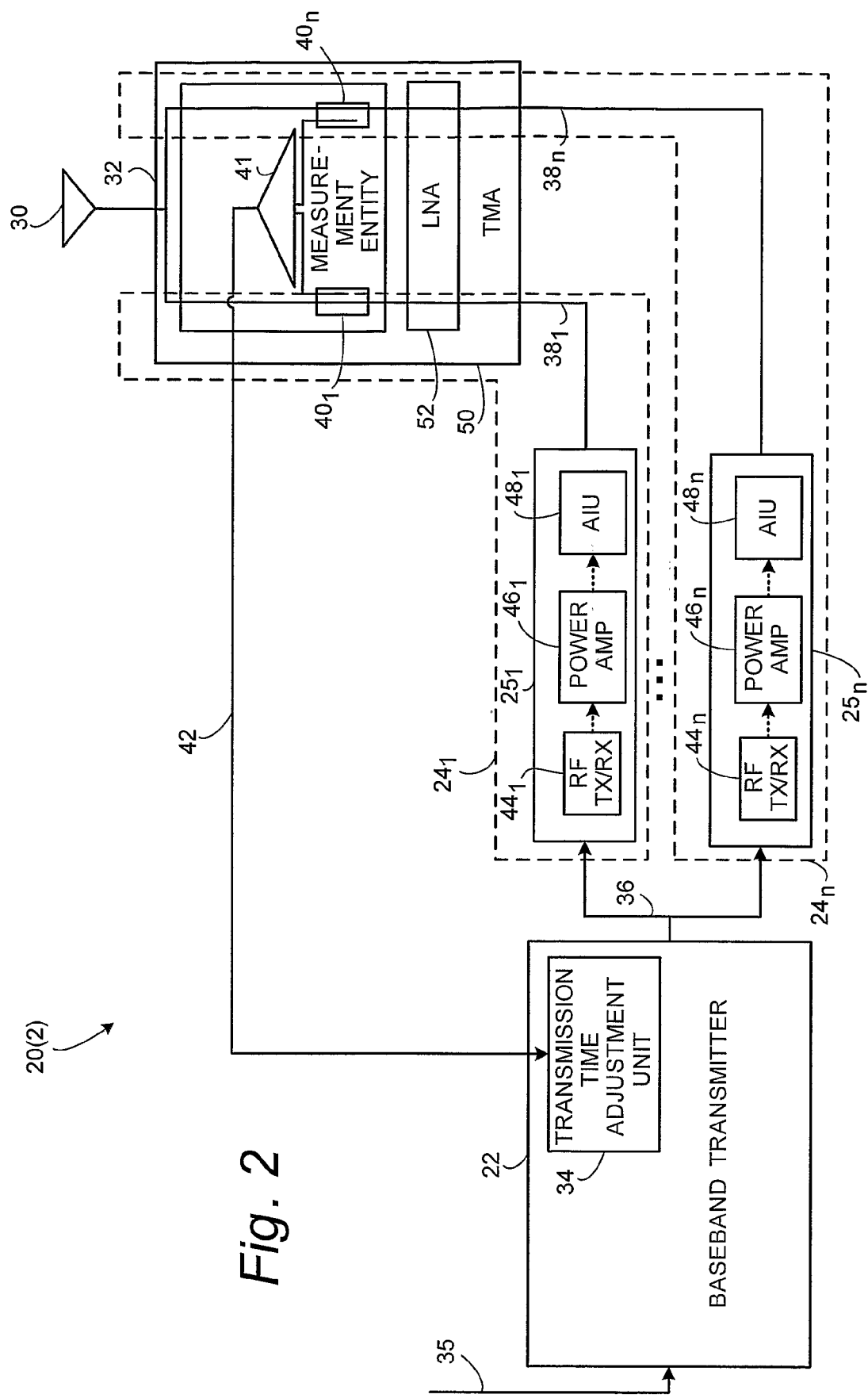
FIG. 2 is a schematic view of an example implementation of the embodiment of FIG. 1.

FIG. 2 shows an example implementation of the generic embodiment of FIG. 1. The FIG. 2 implementation particularly shows some example (non-limiting and non-exhaustive) constituent elements or components of a set of radio frequency transmission elements 25. For example, each set of radio frequency transmission elements can comprise a radio transceiver unit 44 for performing carrier modulation; a power amplifier 46; and, an antenna interface unit 48. The antenna interface unit 48, which can also be referred to as a combiner and distribution unit, performs, e.g., RF signal filtering, duplexing of RF transmit and RF receive signals on RF cables, distribution of RF receive signals towards transceivers, and combination of RF transmit signals towards antennas.

In the example implementation of FIG. 2, the measurement entity 32 is situated substantially at (e.g., is included in) a tower mounted amplifier (TMA) unit 50. In the illustrated but optional case that a low noise amplifier (LNA) 52 is provided for the receive direction, preferably the measurement entity 32 is positioned in the tower mounted amplifier (TMA) unit 50 between the low noise amplifier (LNA) 52 and the antenna system 30. Such positioning compensates for any time variation in the transmission which may be introduced by the presence of the optional LNA 52 in the transmit path.

The measurement entity 32 has its own internal time base or internal clock. The timing of output signals (e.g., occurrences of power level edges) can be determined within the accuracy of the internal clock of the measurement entity 32.

The transmission timing adjustment unit 34 serves as means for using the measurement or comparison developed by measurement entity 32. In an example implementation, the transmission timing adjustment unit 34 is arranged to adjust transmission points in time in a baseband domain so that an optimal time alignment exists between the plural RF transmission paths 24. In a first mode of operation, the desired time alignment is for the time of detection of the power modulation for the first of the plural RF transmission paths $24_1$ and the time of detection of the power modulation for the second of the plural RF transmission paths (e.g., path $24_n$) to be substantially equal. Although not specifically illustrated as such, components such as those of the more detailed FIG. 2 implementation can be utilized in conjunction with other embodiments including the other embodiments described herein.

FIG. 3 shows basic actions performed in the first mode of a power modulation-based transmit path timing alignment operation. FIG. 3 shows as step 3-0 an input signal applied to baseband transmitter 22. In the first mode, the input signal can include or providing a control signal or command that causes (as step 3-1) the baseband transmitter 22 to perform a power modulation of signals applied by the baseband transmitter to the plural RF transmission paths 24. The power modulation can be, for example, a decrease in power (amplitude). The control signal or command that results in power modulation by the baseband transmitter 22 can comprise, be associated with, or occur in conjunction with a standardized function which includes a power modulation aspect, such as (for example) an Idle Period Downlink (IPDL) function or a Discontinuous Transmission (DXT) function.

The Idle Period Downlink (IPDL) function provides a mechanism for allowing periods of attenuated RBS transmit output power during which neighbor cell measurements can be performed. The Idle Period Downlink (IPDL) function is generally described in Tdoc SMG2 UMTS-L1 327/98, Method for downlink positioning (IP-DL), and TSGR1#4 (99)346, Recapitulation of the IPDL positioning method, both of which are incorporated herein by reference in their entirety.

The Discontinuous Transmission (DXT) function switches off the transmit output power for a channel in periods when there is no information to transfer to the receiving side (which may happen, e.g., during talk pauses for a speech connection). The Discontinuous Transmission (DXT) function is described in 3GPP TS 06.31, Discontinuous Transmission (DTX) for Full Rate Speech Traffic Channels, and 3GPP TS 46.04, Half rate speech; Discontinuous Transmission (DTX) for half rate speech traffic channels, both of which are incorporated herein by reference in their entirety.

Step 3-2 of the first example mode of power modulation-based transmit path timing alignment operation involves making a comparison of a time of detection of the power modulation for a first of the plural RF transmission paths and a time of detection of the power modulation for a second of the plural RF transmission paths. The measurement or comparison of step 3-2 is performed by measurement entity 32. One example implementation of how the detection of step 3-2 is illustrated by FIG. 4A. FIG. 4A shows RF power level curves for two RF transmission paths of a radio base station node, e.g., transmission path TX1 and transmission path TXn. In FIG. 4A, time increases along the x axis and RF power level increases along the y axis.

Step 3-3, performed by transmission timing adjustment unit 34 and preferably at baseband transmitter 22, involves using the measurement or comparison of step 3-2 for adjusting timing of transmission of signals for the plural RF transmission paths. The measurement is used for obtaining a desired time alignment for the plural RF transmission paths. In WCDMA, for example, the transmission timing of WCDMA frames is controlled by baseband transmitter 22 and in the digital baseband domain. The baseband transmitter 22 can adjust the point in time at which a transmit frame is sent out towards the radio transceiver 44. In addition to state of the art delay compensation, the power modulation-based transmit path timing alignment operation affords a fine tuning of the timing of the transmission.

In one example implementation, step 3-2, the step of making the measurement or comparison comprises detecting an edge $56_1$ of a RF power level curve of a first RF transmission path $24_1$; detecting an edge $56_n$ of a RF power level curve of a second RF transmission path $24_n$; and, comparing time of the edge $56_1$ and the time of edge $56_n$. As previously indicated, in one variation in which the measurement or comparison is made remotely from the baseband transmitter 22, e.g., proximate antenna system 30 such as at a tower mounted amplifier unit (TMA) 50, the method further comprises reporting the measurement or comparison of to the baseband transmitter 22 (as indicated by the line labeled as step 3-2.5 in FIG. 3).

As mentioned above, in the first mode of power modulation-based transmit path timing alignment operation, the desired time alignment is for the time of detection of the power modulation for the first of the plural RF transmission paths $24_1$ and the time of detection of the power modulation for the second of the plural RF transmission paths (e.g., path $24_n$) to be substantially equal. Such is illustrated in FIG. 4A with a target differential $\Delta_t$ between edge $56_1$ (of the RF power level curve of a the RF transmission path $24_1$) and edge $56_n$ (of the RF power level curve of the second RF transmission path $24_n$) being or approaching zero, e.g., $\Delta_t=0$.

The first example mode type of measurement typically does not introduce any additional disruption of data flow transmitted over the antenna. For example, in the case of DTX there is already implicitly given a situation where currently no transmission takes place over a channel. Also for IPDL the RF transmission power is attenuated. In the case of RBS-generated phases with reduced power, there would be some additional impact on the data transmitted over the air interface. On the receiving side, the mobile station would see a period of time with a lower quality radio link.

Figure 5:
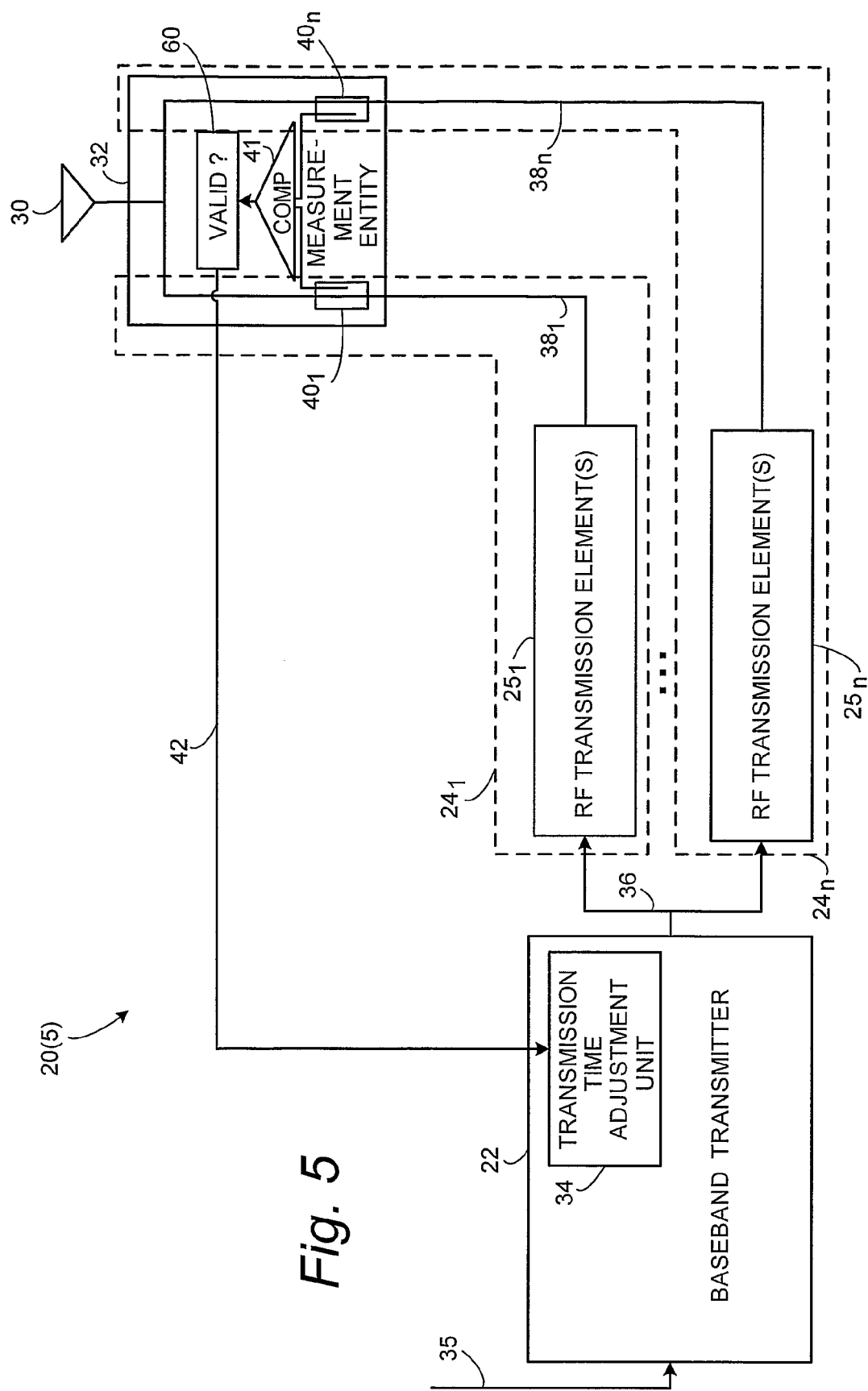
FIG. 5 is a schematic view of an example embodiment of a radio base station node which includes measurement validation.

As an optional aspect of the technology, or in another embodiment, the radio base station node comprises means for validating the measurement or comparison rendered by measurement entity 32. In particular, FIG. 5 shows, in one example implementation, the measurement entity 32 as comprising a measurement validation unit 60 (e.g., means for validating the measurement or comparison). The measurement validation unit 60 can take the form of a processor, circuit, or other suitable device which serves to require that time of detection of the power modulation for the second of the plural RF transmission paths (e.g., path $24_n$) occur within a predetermined validation time interval of the time of detection of the power modulation for the first of the plural RF transmission paths (e.g., path $24_1$).

Figure 6:
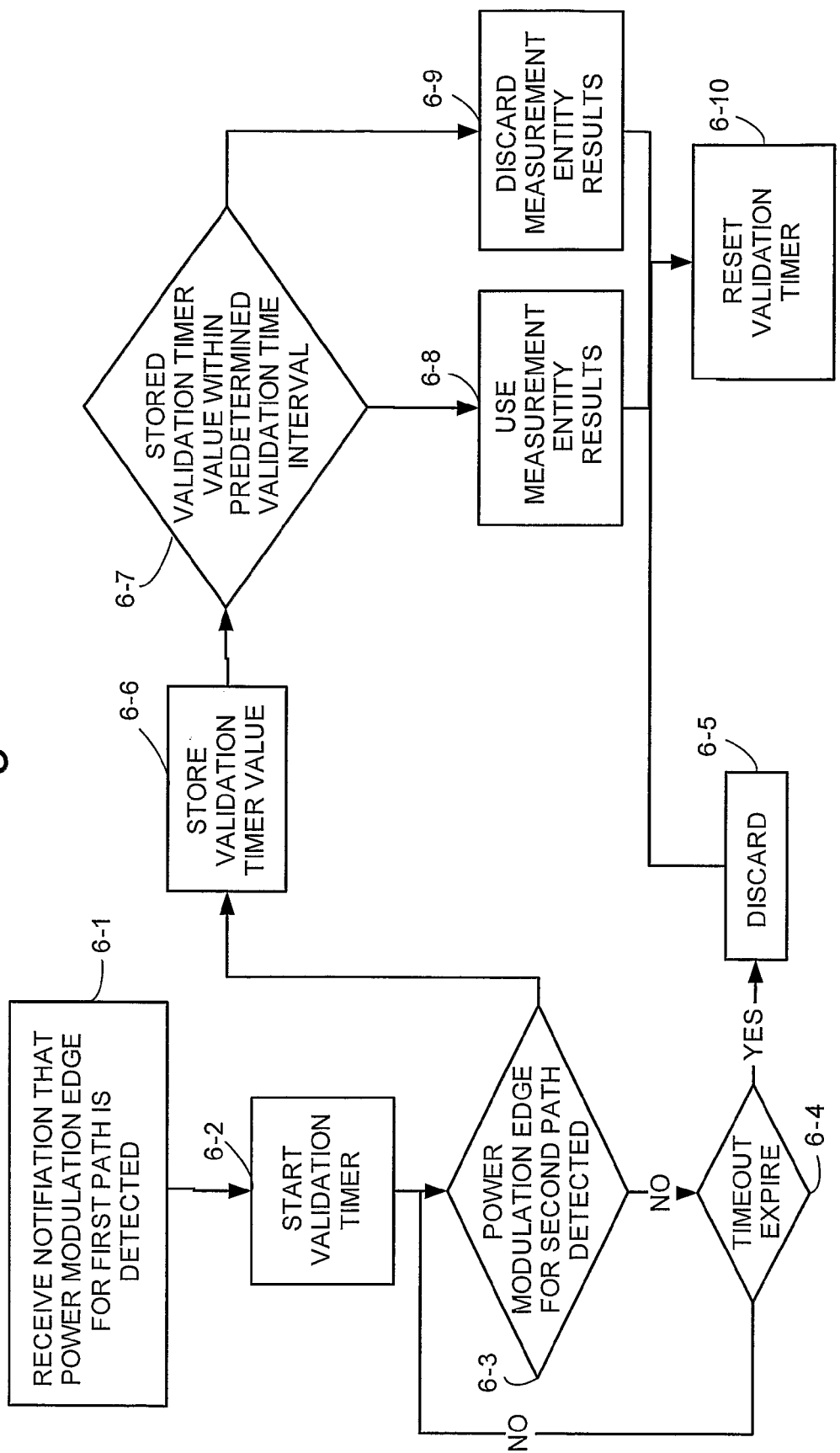
FIG. 6 is a flowchart showing example, non-limiting, basic steps involved in a measurement or comparison validation procedure performed by the embodiment of FIG. 5.

FIG. 6 illustrates example, non-limiting, basic steps involved in a measurement or comparison validation procedure performed by the embodiment of FIG. 5. As step 6-1, the measurement validation unit 60 receives (e.g., from comparator 41) an indication that a power modulation edge (such as edge $56_1$ in FIG. 4A) of a RF power level curve of a first RF transmission path (e.g., path $24_1$) has been detected. As step 6-2 the measurement validation unit 60 starts a validation timer. As step 6-3, the measurement validation unit 60 ascertains when it receives an indication (e.g., from comparator 41) that a power modulation edge (such as edge $56_n$ in FIG. 4A) of a RF power level curve of a second RF transmission path (e.g., path $24_n$) has been detected. If no indication is received for step 6-3 within an expiration timeout (step 6-4), the edge for the first RF transmission path is discarded (step 6-5). On the other hand, if the power modulation edge for the second RF transmission path (e.g., path $24_n$) is detected, at step 6-6 the validation timer is stopped and the timed stored. If it is determined at step 6-7 that the time stored in the validation timer (after being stopped at step 6-6) is within a predetermined validation time interval, as step 6-8 the measurement entity results are utilized, e.g., are conveyed to transmission timing adjustment unit 34. For example, the times of detection of the respective edges or a comparison or differential of such times are utilized or conveyed to transmission timing adjustment unit 34. Otherwise, if the determination at step 6-7 is negative, the results of the measurement entity 32 are discarded (step 6-9). After discard or use, the validation timer is reset (step 6-10).

Figure 7:
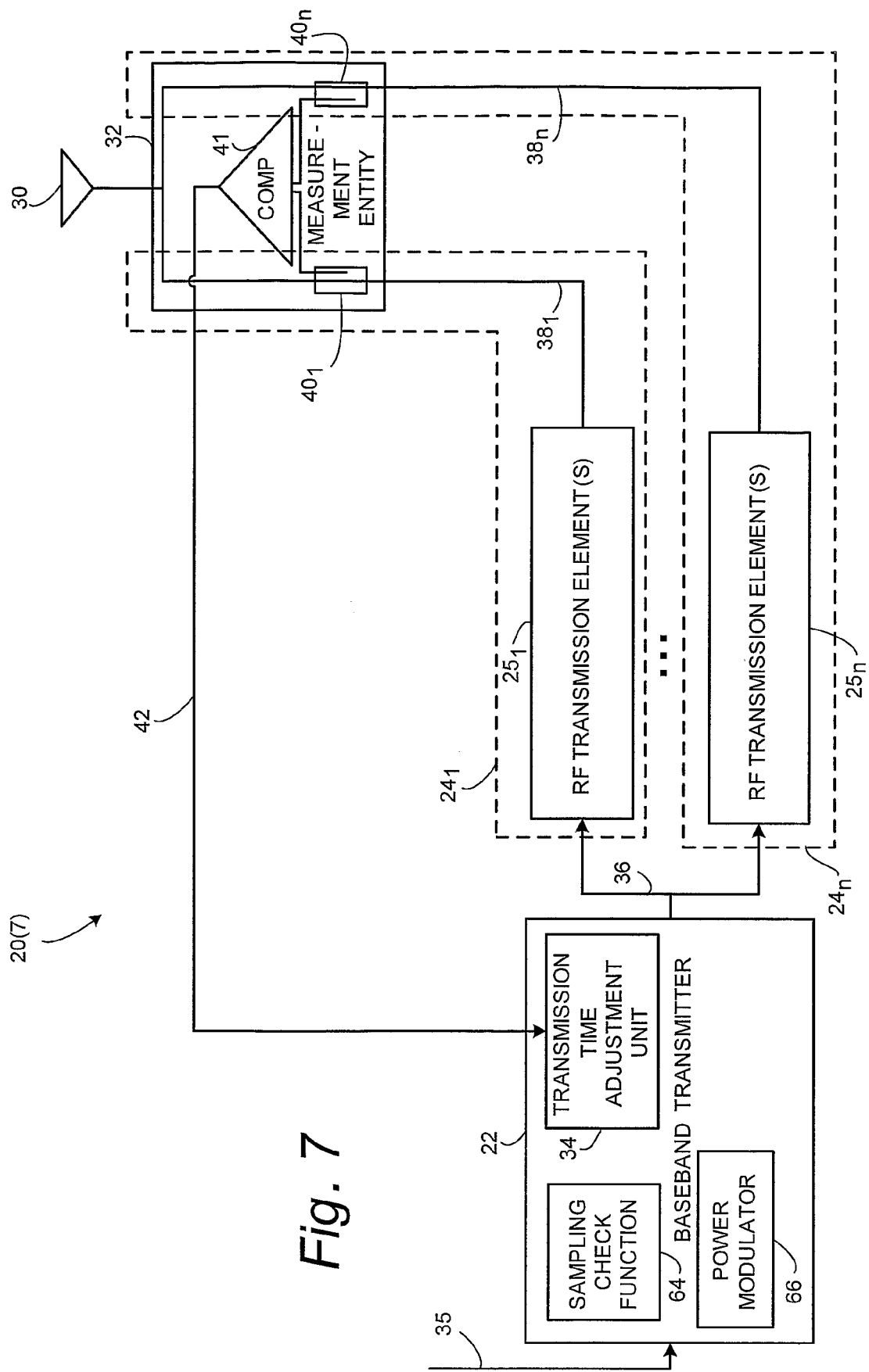
FIG. 7 is a schematic view of an example embodiment of a radio base station node which includes a sampling check function.

As an optional aspect, or as another example embodiment illustrated in FIG. 7, the radio base station node 20(7) can further include a sampling check function 64 for making a determination whether the power modulation-based transmit path timing alignment operation is being preformed with sufficient frequency. In other words, the sampling check function 64 makes a determination whether steps, such as step 3-1 through 3-3 of FIG. 3, are repeated within a predetermined sampling time interval. If a determination is made that the steps 3-1 through 3-3 or comparable steps are not repeated within the predetermined sampling time interval, the sampling check function 64 causes the radio base station node internally to generate the power modulation. For this purpose, the radio base station node 20(7) can further include its own internal power modulator 66.

An example situation in which the radio base station node internally generates the power modulation is illustrated in FIG. 8. In previously-described FIG. 3 the power modulation is by baseband transmitter 22 as a result of, e.g., standard function implementing signals or commands comprising or resulting from the input signals. By contrast, FIG. 8 shows an example situation in which the power modulation is performed by the baseband transmitter 22 or means situated at the baseband transmitter 22 as a result of logic or impetus not related to applied input signals. In particular, in the situation of FIG. 8, step 8-1 represents the power modulation being performed in conjunction with radio base station internal periods of decreased power, e.g., using power modulator 66. The steps 8-2 and 8-3 of FIG. 8 are similar to similarly suffixed steps of FIG. 3. Activation of power modulator 66 and thus the steps of FIG. 8 may be prompted by the sampling check function 64 if the sampling check function 64 determines that the power modulation-based transmit path timing alignment operation is not being preformed with sufficient frequency.

It will be recalled that, in the first example mode of operation, the desired time alignment is for the time of detection of the power modulation for the first of the plural RF transmission paths and the time of detection of the power modulation for the second of the plural RF transmission paths to be substantially equal to a predefined value (e.g., zero, for example). If the first example mode of operation results in sufficient resolution and/or accuracy, the first mode may be employed without aid of further modes of operation. However, if the first mode of operation alone does not achieve satisfactory resolution and/or accuracy, or if desired for other reasons, other modes can be utilized in conjunction or in addition thereto, such as the second example mode of operation described below.

Figure 9:
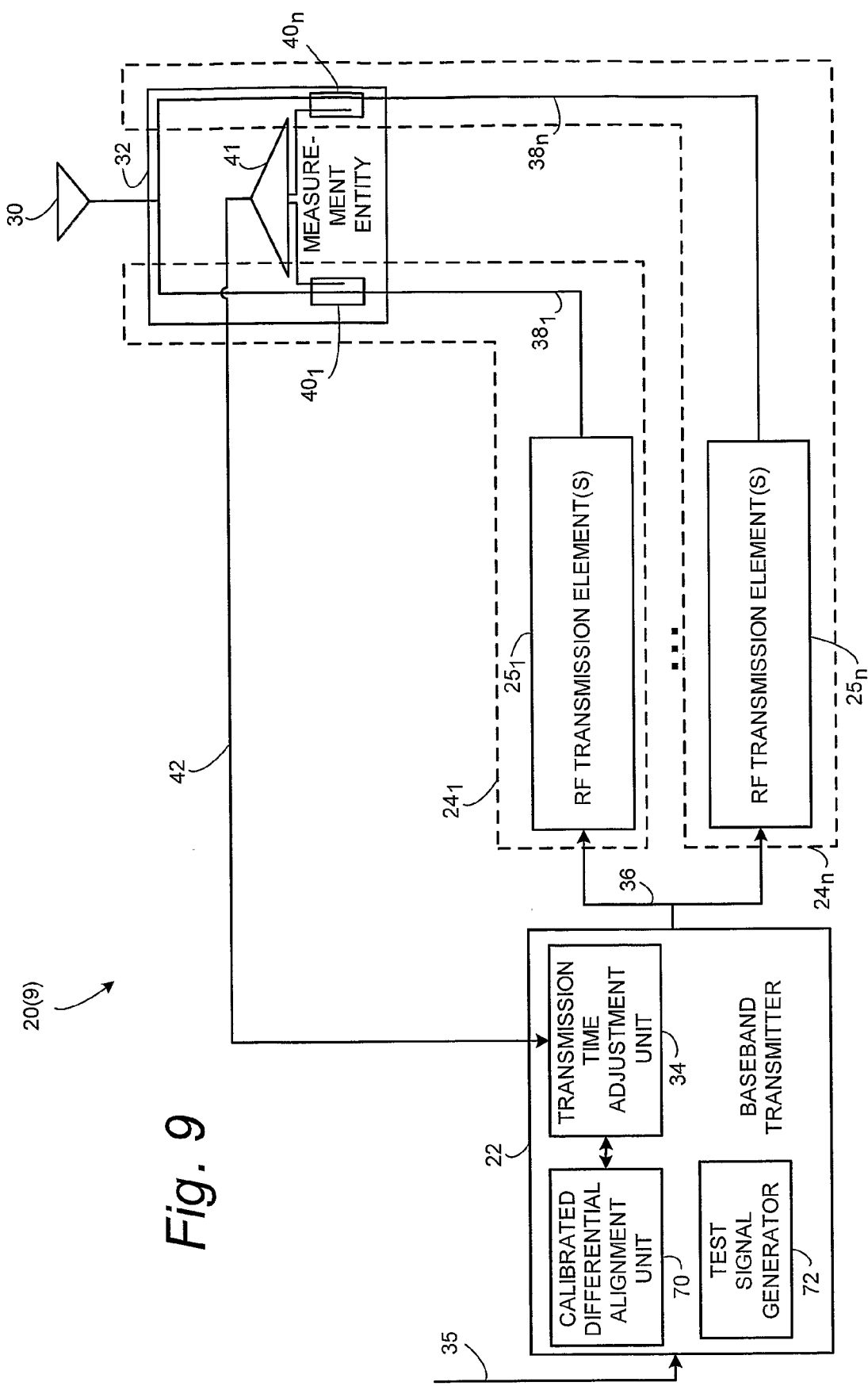
FIG. 9 is a schematic view of an example embodiment of a radio base station node suitable for performing a second example mode of a power modulation-based transmit path timing alignment operation.

In a second mode of operation, also known as a calibration phase, the desired time alignment is for the time of detection of the power modulation for the first of the plural RF transmission paths and the time of detection of the power modulation for the second of the plural RF transmission paths to differ by a calibrated differential alignment. To this end, another embodiment of a radio base station node 20(9) is basically illustrated in FIG. 9. In the example embodiment of FIG. 9, the baseband transmitter 22 comprises a calibration differential alignment unit 70 and a test signal generator 72 in addition to transmission timing adjustment unit 34. The test signal generator 72 serves, e.g., as means for determining the calibrated differential alignment. The calibration differential alignment unit 70 is arranged to generate, at the baseband transmitter, test signals of a predetermined character which can be utilized to produce a desired inter-path interaction of the test signals. The desired inter-path interaction of the test signals can be, for example, a specified degree of cancellation of the test signals.

Figure 10:
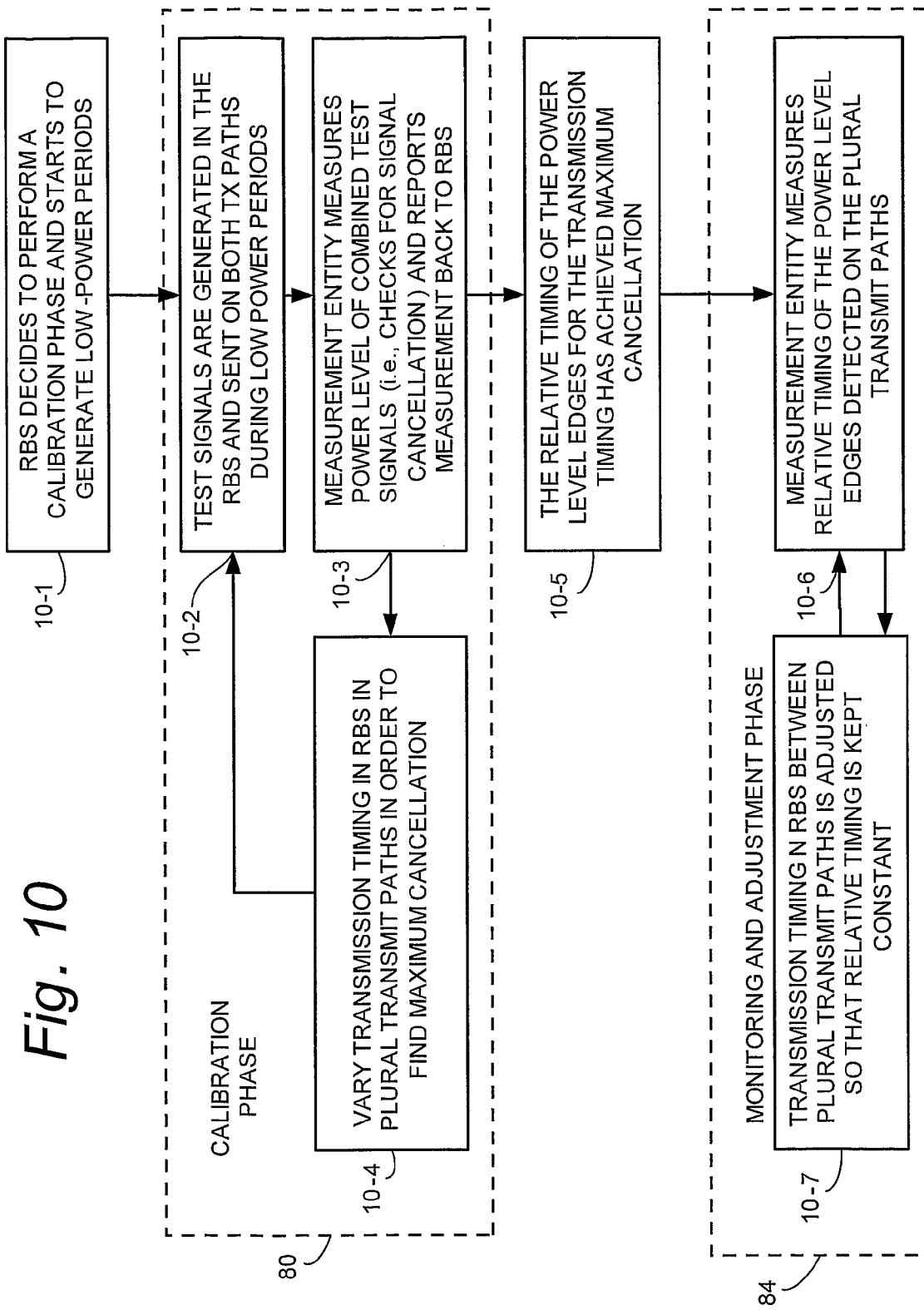
FIG. 10 is a flowchart showing example, non-limiting, basic steps involved in a second example mode of a power modulation-based transmit path timing alignment operation, the second example mode being performed preparatory to performance of a first example mode of power modulation-based transmit path timing alignment operation.

FIG. 10 shows example, non-limiting, basic steps involved in the second example mode of a power modulation-based transmit path timing alignment operation. As subsequently explained, the steps of the second example mode are preferably performed preparatory to performance of the first example mode.

Figure 11:
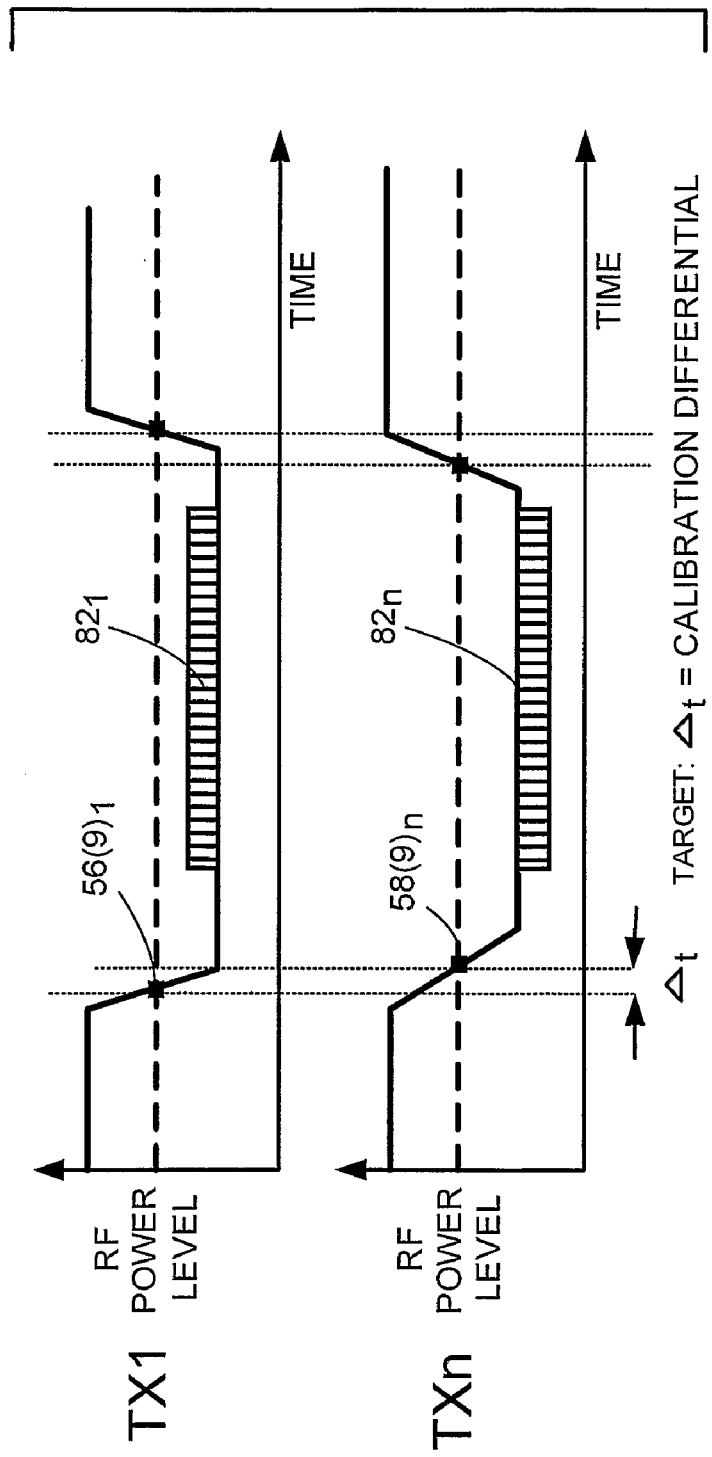
FIG. 11 is a timing diagram showing RF power level curves for two RF transmission paths of a radio base station node for illustrating the second mode of the transmit path timing alignment operation.

Step 10-1 of the second mode involves the radio base station node deciding or being commanded to perform the calibration phase, e.g., to perform the second mode. Basic steps of the second mode are framed by broken line 80 in FIG. 10. As step 10-2, the test signal generator 72 is activated so that test signals 82 are generated in the radio base station node 20(9) on the plural RF transmission paths 24. Preferably these test signals are generated during low-power periods, e.g., periods when low power is utilized for other purposes, as illustrated in FIG. 11. Thus, step 10-2 involves generating, at the baseband transmitter, test signals of a predetermined character. The test signals 82 are applied to the plural RF transmission paths 24, e.g., to the first RF transmission paths 24$_1$ and to the second RF transmission path 24$_2$.

As step 10-3 of the calibration phase (second mode), the measurement entity 32 measures the power level of the combined test signals and reports the result back to calibration differential alignment unit 70. As step 10-4, the transmission timing in the radio base station node 20(9) between the plural RF transmission paths 24 is varied, in order to find the maximum cancellation. For example, the transmission timing adjustment unit 34 varies the transmission timing, and then directs the test signal generator 72 again to generate and apply the test signals 82 (e.g., repeat step 10-2). The loop of step 10-2 through step 10-4 repeats until it is determined (at step 10-5) that the relative timing of the power level edges for the transmission timing has achieved maximum cancellation.

FIG. 11 shows power level edge 58(9)$_1$ for radio frequency (RF) path 24$_1$ and power level edge 58(9)$_n$ for radio frequency (RF) path 24$_n$ being adjusted so that (as combined) the power levels of the test signals 82 applied thereto essentially cancel. When properly adjusted, the combination of test signals leads to the cancellation, i.e., a power level equal to zero (in an ideal environment) is detected at the output (e.g., of a hybrid combiner to which the inputs of the test signals are connected). It may take several iterations of the loop of step 10-2 through step 10-4 to achieve such cancellation. Thus, the loop of the calibration phase involves applying the test signals (with plural test application timing differentials) to the first of the plural RF transmission paths and the second of the plural RF transmission paths.

Once it is determined (at step 10-5) that the maximum cancellation has been achieved by the calibration phase (second mode), the timing transmission differential which achieved the cancellation is used as the calibrated differential alignment. In the situation shown in FIG. 11, the $\Delta_t$ becomes the calibrated differential alignment which, as a result of the loop of the calibration phase, results in the maximum cancellation. In this sense, the desired time alignment previously referenced is the calibrated differential alignment obtained by the calibration phase. Thus, the second mode or calibration phase uses, as the calibrated differential alignment, a one of the plural test application timing differentials which produces a desired inter-path interaction of the test signals. The desired inter-path interaction of the test signals can be a specified degree of cancellation of the test signals.

As indicated above, the calibration phase or second mode can be implemented at any suitable time, e.g., at start up or during other appropriate low power periods. Thereafter, during normal usage and operation of the radio base station node 20 performs the first example mode, which in FIG. 10 is also referred to as the monitoring and adjustment phase. Steps of the monitoring and adjustment phase (first example mode) are framed by broken line 84 in FIG. 10.

In the monitoring and adjustment phase (first example mode), step 10-6 involves the measurement entity 32 measuring the relative timing of the power level edges detected on the plural RF transmission paths 24. Such measuring is essentially that depicted in FIG. 3. Then, as step 10-7, the transmission timing adjustment unit 34 adjusts the transmission timing on the plural RF transmission paths 24 so that the relative timing is kept constant. When the calibration phase has preceded the monitoring and adjustment phase and yielded a non-zero calibrated differential alignment, the timing which is kept relatively constant is the non-zero calibrated differential alignment as shown in FIG. 11.

As explained above, the second example mode of operation is preferably performed in a calibration phase which precedes or is distinct from a monitoring and adjustment phase during which the first example mode of operation is performed. When the second example mode of operation has been performed, the desired time alignment subsequently utilized in the first mode of operation is usually the calibrated differential alignment determined in the second example mode.

Features from the foregoing embodiments may be combined with other embodiments as desired. By way of non-limiting example, the validation check of the embodiment of FIG. 5 can be combined with the second mode embodiment of FIG. 9, for example.

Figure 12:
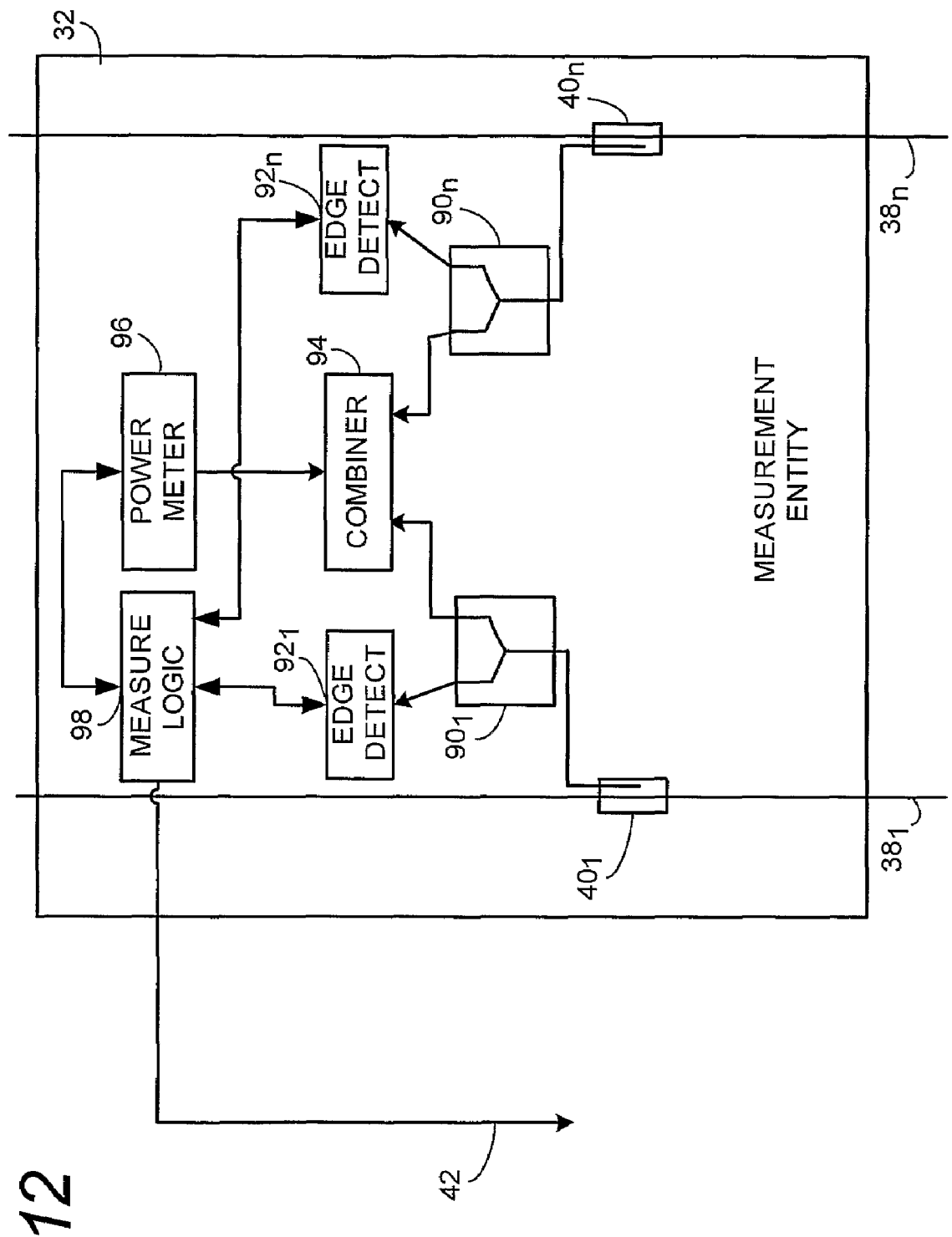
FIG. 12 is a schematic view of an example implementation of a measurement entity of a radio base station node.

FIG. 12 illustrates in more detail an example implementation of an example measurement entity 32. The measurement entity 32 includes the couplers 40$_1$ and 40$_n$, as previously described. Coupled outputs from the couplers 40 are connected to respective splitters 90, e.g., splitter 90$_1$ and splitter 90$_n$. A first output of splitter 90$_1$ is applied to an edge detector 92$_1$, while a second output of splitter 90$_1$ is applied to a first input port of combiner 94. Similarly, a first output of splitter 90$_n$ is applied to an edge detector 92$_n$, while a second output of splitter 90$_n$ is applied to a second input port of combiner 94. Combiner 94 is connected to power meter 96. Measurement logic 98 is connected by analog or digital control lines to the RF components of the measurement entity, e.g., combiner 94, power meter 96, and the edge detectors 92, for controlling or coordinating the actions thereof. The period in time between the occurrence of the detected power level edges on the plural RF transmission paths 24 can be determined in units of the internal clock of measurement entity 32 (e.g., measurement logic 98), and this value reported back by measurement logic 98 to transmission timing adjustment unit 34 over signaling link 42 (e.g., as a digital data value).

Thus, the power modulation-based transmit path timing alignment herein described achieves a good (relative) time alignment on different transmit paths (e.g., plural RF transmission paths 24) up to the antenna system 30, including all equipment like external diplexer or external filters. The actual alignment is accomplished in the RBS based on measurements done close to the antenna system.

In brief, the first example method involves the following:

Performing a comparative measurement on different TX paths close to the antenna system, e.g. in a TMA device. This device also has a signalling link to the RBS.

Making use of a feature such as IPDL, which results in periods with significantly attenuated RF transmit power attenuation, or generating RBS internal RF power transmission gaps (or periods with decreased RF power).

Using the points in time, when RF power level edges are detected (caused either by IPDL or generated RBS internally), as input for the comparative measurement.

Reporting the results of the measurement back to the RBS (e.g., to transmission timing adjustment unit 34) and adjusting the timing between the plural TX paths in such a way that a minimum difference is determined by the measurement in the TMA.

When also using the second example method, the measurement accuracy can be further improved by introducing suitable RF test signals. The test signals can be sent with low power level during, e.g., the RBS internally generated reduced power phase or when power is reduced because of IPDL. When so doing, preferably the test signals on two transmit (TX) paths are chosen is such a way that combining them results in a signal cancellation. As mentioned above, this second mode or calibration phase is optional and can be utilized if resolution/accuracy of pure "edge timing" comparison is not sufficient.

An overall objective of the power modulation-based transmit path timing alignment operation is to optimize the timing difference of different TX signals close to the antenna system. Accordingly, if the signals are generated in the baseband transmitter 22 at the same time, the delay variations on the signal paths up to the antenna system must be compensated (see FIG. 1). With the power modulation-based transmit path timing alignment operation, no absolute compensation value has to be determined, but the transmission point in times in the baseband domain are adjusted so that an optimal time alignment (relative between two TX paths) can be detected in the measurement entity (i.e. close to the antenna system).

It is assumed, and accordingly illustrated in the figures, that both TX paths are routed through the same TMA device. Moreover, in order to perform a timing comparison between the signals on different RF paths, a common time reference must be provided within or towards the measurement entity.

As shown, for example, in FIG. 12, a portion of the RF TX signal are coupled out in the TMA device and fed into the measurement entity.

Two different types or modes of measurements are proposed for the measurement entity 32 (ME):

Measurement M1 (first example mode, or monitoring and adjustment phase), wherein inside the measurement entity 32 a detector detects the falling and rising edge of the signals' power level curve. The time difference between detected edges on two TX paths is determined.

Measurement M2 (second example mode, or calibration phase), wherein, in addition to the measurement M1 as described above, the level of signal cancellation of the combined test signals is also measured. Combination of test signals in the measurement entity (needed for M2 types of measurements) can be realized, for instance, by a hybrid combiner type of hardware component.

If sufficient resolution/accuracy can be achieved by pure comparison of detected edge times, only measurement M1 needs to be implemented. The target value for the time alignment control loop is according to FIG. 4A. Otherwise, additional calibration phase(s) shall be implemented. The corresponding control algorithm is shown in FIG. 10. In this case measurements M1 and M2 need to be implemented, where M2 measurements are needed in the "calibration phase" while M1 measurement is sufficient in the "monitoring and adjustment phase". The target value for the time alignment control loop in the "monitoring and adjustment phase" here is according to FIG. 4B.

The M1 type of measurement detects the edges in the RF power signals on both (or more) TX paths and determines the time difference between the edges on different TX paths. For this type of measurement simply all sorts of edges can be used, regardless whether they are caused by standard functions as IPDL, DTX etc. or whether the edges are initiated by RBS internal periods of decreased power.

In order to avoid using "invalid" measurement samples for the time alignment algorithm of TX paths, an optional autonomous invalidation criterion shall be implemented in the measurement entity 32, as previously explained with reference to FIG. 5 and FIG. 6. When the first edge is detected on one of the measured TX paths, then a timer with a possibly configurable time-out is started. In the "normal" case the second edge on another TX path should be detected before the time-out occurs. If, however, a time-out happens, then this measurement sample shall be invalidated.

Valid measurements are reported back from the measurement entity 32 to the RBS over the signalling link 42.

In order to ensure a reasonable timing alignment of TX paths, there must not be too long a period of time without edges in RF power signals that can be used for measurement M1. If the time of the last measurement exceeds a given limit, then the RBS itself must internally generate edges, i.e. a period of decreased RF power, as above explained with reference to FIG. 9. In the M1 measurement, based on the measurement results reported from measurement entity 32, the transmission timing on the TX paths is controlled (adjusted) toward the control loop target value given in FIG. 4A.

The M2 type of measurement requires that test signals with low power are generated in the RBS during RBS internally initiated decreased RF power periods (see FIG. 11). The test signals constructed in such a way, that for a perfect time alignment on two TX paths, a signal cancellation for the combined signal appears. The RBS must ensure that measurements are performed with sufficient frequency.

The RBS needs to inform the measurement entity 32 about the time schedule of test signal generation, so that the measurement entity 32 knows when this type of measurement actually shall be carried out. This needed information can either be sent explicitly to the ME over the signalling link 42 or it can be "coded" in the shape of the decreased RF power period (e.g. this kind of decreased power period has a duration, which only occurs for RBS initiated decreased power periods).

Based on the measurement results reported from measurement entity 32, the transmission timing on the TX paths is controlled (adjusted) toward the control loop target value given in FIG. 4B, i.e. the measured $\Delta_t$ for the timing with best signal cancellation of the combined test signals shall be kept.

The measurement entity 32 is informed by the RBS when a M2 type of measurement is due. For each ME measurement, the measurement entity (ME) 32 needs to provide a set of measurement results containing the following data:

1. The time difference between the detected edges on both TX paths (edge detectors shown in FIG. 12 are employed).
2. The power level of the combined test signals (the comparator 41 shown in FIG. 12 is employed).

Valid measurement results are reported back from the ME to the RBS over the signalling link.

Using the power modulation-based transmit path timing alignment operation, the following advantages can be achieved:

In general, an adaptive transmission time alignment of multiple TX paths is possible, where the TX paths can be covered up to close to the antenna system. Such is especially important for TX diversity.

For co-siting scenarios this means in particular that even for additional RBS external (possibly shared) equipment in one or more TX path compensation can be achieved.

In particular, also dynamic effects like ageing, temperature drifts etc. can be handled.

A preferred platform handles, within one device, all transmit paths for/between which the time alignment method described herein is implement.

Figure 13:
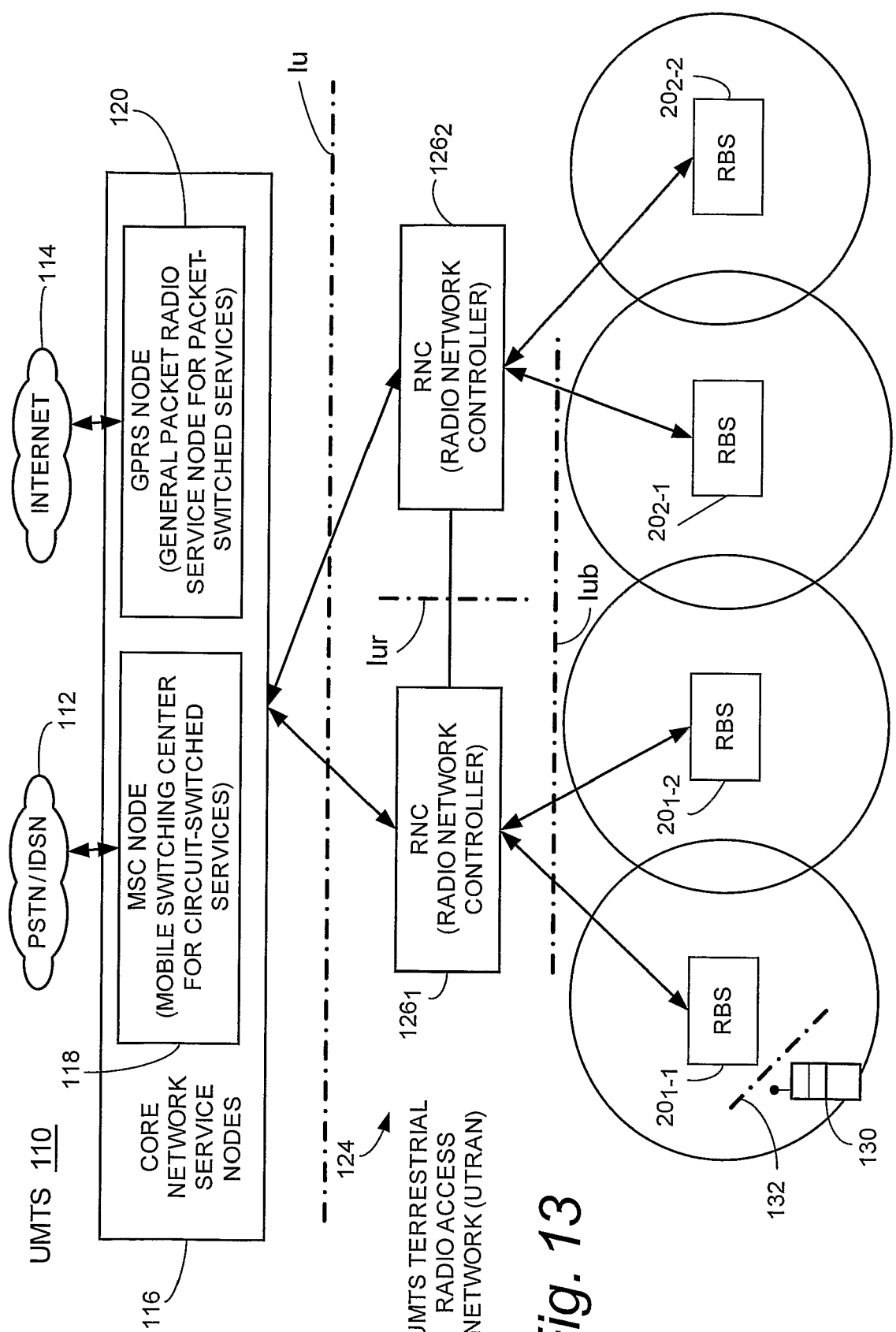
FIG. 13 is a diagrammatic view of an example, non-limiting mobile communications system in which embodiments and modes of the technology may be advantageously employed.

FIG. 13 shows a non-limiting, example context of a universal mobile telecommunication system (UMTS) 10 in which the radio base station nodes of the embodiments described herein may be employed. A representative, connection-oriented, external core network, shown as a cloud 112 may be for example the Public Switched Telephone Network (PSTN) and/or the Integrated Services Digital Network (ISDN). A representative, connectionless external core network shown as a cloud 114, may be for example the Internet. Both core networks are coupled to their corresponding service nodes 116. The PSTN/ISDN connection-oriented network 112 is connected to a connection-oriented service node shown as a Mobile Switching Center (MSC) node 118 that provides circuit-switched services. The Internet connectionless-oriented network 114 is connected to a General Packet Radio Service (GPRS) node 120 tailored to provide packet-switched type services which is sometimes referred to as the serving GPRS service node (SGSN).

Each of the core network service nodes 118 and 120 connects to a UMTS Terrestrial Radio Access Network (UTRAN) 124 over a radio access network (RAN) interface referred to as the Iu interface. UTRAN 124 includes one or more radio network controllers (RNCs) 126. For sake of simplicity, the UTRAN 124 of FIG. 13 is shown with only two RNC nodes, particularly RNC $126_1$ and RNC $126_2$. Each RNC 126 is connected to a plurality of radio base stations (RBS) 20. For example, and again for sake of simplicity, two radio base station nodes are shown connected to each RNC 126. In this regard, RNC $126_1$ serves radio base station $20_{1-1}$ and radio base station $20_{1-2}$, while RNC $126_2$ serves radio base station $20_{2-1}$ and radio base station $20_{2-2}$. It will be appreciated that a different number of radio base stations can be served by each RNC, and that RNCs need not serve the same number of radio base stations. Moreover, FIG. 13 shows that an RNC can be connected over an Iur interface to one or more other RNCs in the URAN 124. Further, those skilled in the art will also appreciate that a radio base station is sometimes also referred to in the art as a node B, or B-node.

In the illustrated embodiments, for sake of simplicity each radio base station 20 is shown as serving one cell. Each cell is represented by a circle which surrounds the respective radio base station. It will be appreciated by those skilled in the art, however, that a radio base station may serve for communicating across the air interface for more than one cell. For example, two cells may utilize resources situated at the same radio base station site.

A user equipment unit (UE), such as user equipment unit (UE) 130 shown in FIG. 13, communicates with one or more cells or one or more radio base stations (RBS) 20 over a radio or air interface 132. Each of the radio interface 132, the Iu interface, the Iub interface, and the Iur interface are shown by dash-dotted lines in FIG. 13.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A method of operating a radio base station node of a telecommunications system, the radio base station node having plural radio frequency (RF) transmission paths between a baseband transmitter of the radio base station node and an antenna system of the radio base station node, the method comprising:
   (1) providing a power modulation, wherein the power modulation is a decrease in RF transmission power, and wherein the power modulation occurs in RF transmission power occurs in conjunction with a standardized function, of signals applied by the baseband transmitter to the plural RF transmission paths;
   (2) making a comparison of a time of detection of the power modulation for a first of the plural RF transmission paths and a time of detection of the power modulation for a second of the plural RF transmission paths;
   (3) using the comparison of step (2) for adjusting timing of transmission of signals for the plural RF transmission paths for obtaining a desired time alignment for the plural RF transmission paths, wherein the desired time alignment is for the time of detection of the power modulation for the first of the plural RF transmission paths and the time of detection of the power modulation for the second of the plural RF transmission paths to be substantially equal to a calibrated differential alignment;
   and determining the calibrated differential alignments by performing the steps of:
      generating, at the baseband transmitter, test signals of a predetermined character;
      applying the test signals with plural test application timing differentials to the first of the plural RF transmission paths and the second of the plural RF transmission paths;
      using as the calibrated differential alignment a one of the plural test application timing differentials which produces a desired inter-path interaction of the test signals.

2. The method of claim 1, wherein the standardized function is one of an Idle Period Downlink (IPDL) function and a Discontinuous Transmission (DXT) function.

3. The method of claim 1, wherein the power modulation is a decrease in RF transmission power, and wherein the power modulation occurs in conjunction with radio base station internal periods of decreased power.

4. The method of claim 1, wherein the step of making the comparison comprises:
   (a) detecting an edge of a RF power level curve of the first of the plural RF transmission paths;
   (b) detecting an edge of a RF power level curve of the second of the plural RF transmission paths;
   (c) comparing time of the edge of substep (a) and the edge of substep (b).

5. The method of claim 1, further comprising validating the comparison by requiring that time of detection of the power modulation for the second of the plural RF transmission paths occur within a predetermined validation time interval of the time of detection of the power modulation for the first of the plural RF transmission paths.

6. The method of claim 1, further comprising making a determination whether steps (1)-(3) are repeated within a predetermined sampling time interval.

7. The method of claim 6, wherein if a determination is made that the steps (1)-(3) are not repeated within the predetermined sampling time interval, the method further comprises causing the radio base station node internally to generate the power modulation.

8. The method of claim 1, wherein the desired time alignment is for a difference in (1) the time of detection of the power modulation for the first of the plural RF transmission paths and (2) the time of detection of the power modulation for the second of the plural RF transmission paths to substantially equal a predefined value.

9. A radio base station node of a telecommunications network, the radio base station node comprising:
   a baseband transmitter;
   plural ratio frequency (RF) paths between the baseband transmitter and an antenna system;
   a measurement entity for making a comparison of a time of detecting of a power modulation, wherein the power modulation is a decrease in RF transmission power, and wherein the power modulation in RF transmission power occurs in conjunction with a standardized function, for a first of the plural RF transmission paths and a time of detection of a power modulation for a second of the plural RF transmission paths;
   wherein the baseband transmitter comprises a transmission timing adjustment unit for using the comparison for adjusting timing of transmission of signals for the plural RF transmission paths for obtaining a desired time alignment for the plural RF transmission paths;
   wherein the desired time alignment is for the time of detection of the power modulation for the first of the plural RF transmission paths and the time of detection of the power modulation for the second of the plural RF transmission paths to be substantially equal to a calibrated differential alignment;
   means for determining the calibrated differential alignment, the means for determining the calibrated differential alignment being arranged for generating, at the baseband transmitter, test signals of a predetermined character which can be utilized wherein the desired inter-path interaction of the test signals is a specified degree of cancellation of the test signals.

10. The radio base station node of claim 9, further comprising means for providing the power modulation of the signals applied by the baseband transmitter to the plural RF transmission paths.

11. The radio base station node of claim 9, wherein the standardized function is one of an Idle Period Downlink (IPDL) function and a Discontinuous Transmission (DXT) function.

12. The radio base station node of claim 9, wherein the power modulation occurs in conjunction with radio base station internal periods of decreased power.

13. The radio base station node of claim 9, the comparison is performed at a tower mounted amplifier (TMA) unit.

14. The radio base station node of claim 9, wherein the desired time alignment is for a difference in (1) the time of detection of the power modulation for the first of the plural RF transmission paths and (2) the time of detection of the power modulation for the second of the plural RF transmission paths to substantially equal a predefined value.

* * * * *